(12) United States Patent
Stenneth et al.

(10) Patent No.: US 11,697,432 B2
(45) Date of Patent: Jul. 11, 2023

(54) METHOD, APPARATUS AND COMPUTER PROGRAM PRODUCT FOR CREATING HAZARD PROBABILITY BOUNDARIES WITH CONFIDENCE BANDS

(71) Applicant: HERE Global B.V., Eindhoven (NL)

(72) Inventors: Leon Stenneth, Chicago, IL (US); Advait Raut, Mumbai (IN)

(73) Assignee: HERE GLOBAL B.V., Eindhoven (NL)

(*) Notice: Subject to any disclaimer, the term of this patent is extended or adjusted under 35 U.S.C. 154(b) by 306 days.

(21) Appl. No.: 17/118,308

(22) Filed: Dec. 10, 2020

(65) Prior Publication Data

US 2022/0073102 A1 Mar. 10, 2022

Related U.S. Application Data

(60) Provisional application No. 63/074,727, filed on Sep. 4, 2020.

(51) Int. Cl.
| | |
|---|---|
| *B60W 60/00* | (2020.01) |
| *G08G 1/0967* | (2006.01) |
| *B60W 30/02* | (2012.01) |
| *B60W 10/10* | (2012.01) |
| *B60W 50/14* | (2020.01) |

(52) U.S. Cl.
CPC ........ *B60W 60/0015* (2020.02); *B60W 10/10* (2013.01); *B60W 30/02* (2013.01); *B60W 50/14* (2013.01); *B60W 60/0053* (2020.02); *G08G 1/096725* (2013.01)

(58) Field of Classification Search
CPC .. B60W 60/0015; B60W 10/10; B60W 30/02; B60W 50/14; B60W 60/0053; G08G 1/096725; G08G 1/0112; G08G 1/0133; G08G 1/0141; G08G 1/096775; G08G 1/096741

See application file for complete search history.

(56) References Cited

U.S. PATENT DOCUMENTS

| | | |
|---|---|---|
| 9,221,461 B2 | 12/2015 | Ferguson et al. |
| 10,147,326 B2 | 8/2018 | Koduru et al. |

(Continued)

FOREIGN PATENT DOCUMENTS

JP 5570672 B1 8/2014

*Primary Examiner* — Alan D Hutchinson
(74) *Attorney, Agent, or Firm* — Alston & Bird LLP

(57) ABSTRACT

Embodiments described herein may provide a method for generating a local hazard warning boundary and at least one confidence band therein. Methods may include: receiving a plurality of probe data points from a plurality of probes within a region, where each probe data point includes location information and an indication of a hazardous condition; generating, based on the plurality of probe data points, a boundary within the region identifying an area within which the hazardous condition is determined to exist with at least a first degree of confidence; generating, based on the plurality of probe data points, a confidence band within the boundary within which the hazardous condition is determined to exist with a second degree of confidence; and providing for an indication of the boundary and the confidence band to at least one of an autonomous vehicle control or to a driver assistance system.

20 Claims, 5 Drawing Sheets

(56) References Cited

U.S. PATENT DOCUMENTS

2018/0204287 A1    7/2018   Collins et al.
2018/0247542 A1*   8/2018   Koduru ................ G08G 5/0026
2019/0353499 A1   11/2019   Stenneth

* cited by examiner

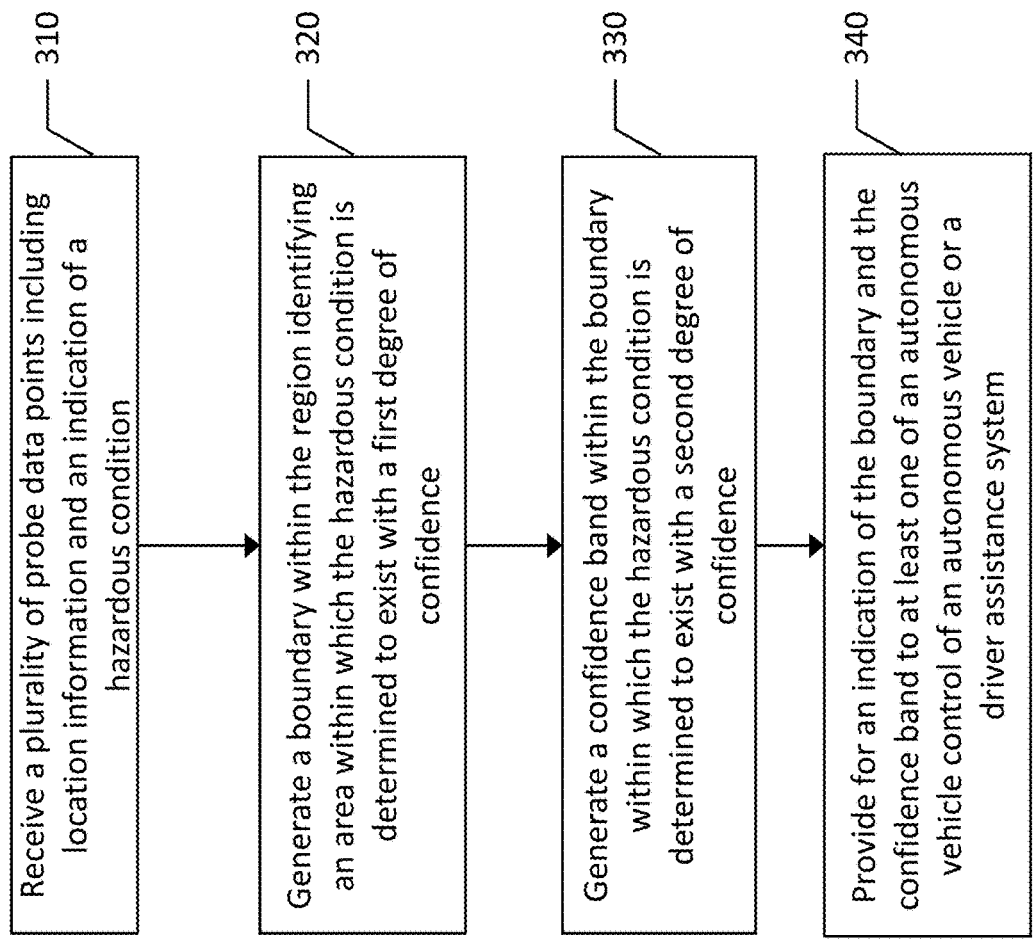

METHOD, APPARATUS AND COMPUTER PROGRAM PRODUCT FOR CREATING HAZARD PROBABILITY BOUNDARIES WITH CONFIDENCE BANDS

CROSS-REFERENCE TO RELATED APPLICATIONS

This application claims priority to U.S. Provisional Patent Application Ser. No. 63/074,727, filed on Sep. 4, 2020, the contents of which are hereby incorporated by reference in their entirety.

TECHNOLOGICAL FIELD

An example embodiment of the present invention relates generally to providing local hazard warnings to an apparatus or device proximate a given location, and more particularly, to a method, apparatus and computer program product for identifying an area bounded by a boundary that contains hazardous conditions, and identifying different bands of confidence of the hazardous condition within the boundary.

BACKGROUND

Weather stations may be used to gather information regarding weather-related information at geographically dispersed locations, such that the weather information may be used for historical trend data, current weather reporting, and future weather prediction. Weather stations may include various sensors to gather weather-related information and report an abundance of weather attributes, such as temperature, humidity, barometric pressure, visibility, precipitation, wind speed, wind direction, etc. Weather stations traditionally have included stationary apparatus that included various types of specifically configured sensors to gather weather-related data. These traditional weather stations are conventionally located at airports, military bases, remote outposts, etc. However, certain regions may lack weather stations close by such that weather for an area may not be readily available and of questionable accuracy.

One drawback of using location-based weather data from weather stations is that the weather data may only approximate the weather at a location in which a user is interested. The ubiquity of weather stations may result in an abundance of weather-related information, much of which may not be material to the desired weather information. More granular weather estimations may be provided by crowd-sourced sensors that can better define a region in which hazardous conditions exist.

BRIEF SUMMARY

A method, apparatus, and computer program product are therefore provided for identifying an area bounded by a boundary that contains hazardous conditions, and identifying different bands of confidence of the hazardous condition within the boundary. An apparatus may be provided including at least one processor and at least one non-transitory memory including computer program code instructions, the computer program code instructions may be configured to, when executed, cause the apparatus to at least: receive a plurality of probe data points from a plurality of probes within a region, where each probe data point includes location information and an indication of a hazardous condition; generate, based on the plurality of probe data points indicating a hazardous condition, a boundary within the region identifying an area within which the hazardous condition is determined to exist with at least a first degree of confidence; generate, based on the plurality of probe data points indicating a hazardous condition, a confidence band within the boundary within which the hazardous condition is determined to exist with a second degree of confidence, higher than the first degree of confidence; and provide for an indication of the boundary and the confidence band to at least one of an autonomous vehicle control of an autonomous vehicle or to a driver assistance system.

Causing the apparatus to generate a boundary within the region identifying an area within which the hazardous condition is determined to exist within at least a first degree of confidence based on the plurality of probe data points is further based on time information associated with the probe data points. Causing the apparatus to generate a boundary within the region within which the hazardous condition is determined to exist with at least a first degree of confidence based on the plurality of probe data points may include causing the apparatus to: model the probe data using a Gaussian Mixture Model to identify Gaussian clusters and respective mixing probabilities; generate a covariance matrix based on the Gaussian Mixture Model; augment the covariance matrix of each Gaussian cluster; divide a bounding box for the hazardous condition into a plurality of grid cells; and calculate a probability density for each grid cell based on the augmented covariance of the Gaussian clusters and the respective mixing probabilities, where the probability density is indicative of a probability of the hazardous condition existing at the respective grid cell.

According to some embodiments, the apparatus may be caused to: select a first subset of grid cells to define a polygon bounded by the boundary; and select a second subset of grid cells to define the confidence band within the boundary. Causing the apparatus to provide for an indication of the boundary and the confidence band to at least one of an autonomous vehicle control of an autonomous vehicle or to a driver of a vehicle may include causing the apparatus to: provide for a change in an operational state of a vehicle in response to the vehicle approaching or entering a region corresponding to at least one of the boundary or the confidence band. Causing the apparatus to provide for a change in an operational state of a vehicle in response to the vehicle approaching or entering a region corresponding to at least one of the boundary or the confidence band may include causing the apparatus to provide an indication that autonomous vehicle control of the vehicle is ceding vehicle control to a driver. Causing the apparatus to provide for a change in an operational state of a vehicle in response to the vehicle approaching or entering a region corresponding to at least one of the boundary or the confidence band may include causing the apparatus to provide for at least one of: changing a traction control setting of the vehicle, changing a drive mode of the vehicle, or changing a transmission shift pattern of the vehicle.

Embodiments provided herein may include a computer program product having at least one non-transitory computer-readable storage medium with computer-executable program code instructions stored therein, the computer-executable program code instructions including program code instructions to: receive a plurality of probe data points from a plurality of probes within a region, where each probe data point includes location information and an indication of a hazardous condition; generate, based on the plurality of probe data points indicating a hazardous condition, a boundary within the region identifying an area within which the hazardous condition is determined to exist with at least a first degree of confidence; generate, based on the plurality of probe data points indicating a hazardous condition, a confidence band within the boundary within which the hazardous condition is determined to exist with a second degree of confidence, higher than the first degree of confidence; and provide for an indication of the boundary and the confidence band to at least one of an autonomous vehicle control of an autonomous vehicle or to a driver assistance system.

The program code instructions to generate a boundary within the region identifying an area within which the hazardous condition is determined to exist with at least a first degree of confidence based on the plurality of probe data points is further based on time information associated with the probe data points. The program code instructions to generate a boundary within the region identifying an area within the region within which the hazardous condition is determined to exist with at least a first degree of confidence based on the plurality of probe data points may include program code instructions to: model the probe data using a Gaussian Mixture Model to identify Gaussian clusters and respective mixing probabilities; generate a covariance matrix based on the Gaussian Mixture Model; augment the covariance matrix of each Gaussian cluster; divide a bounding box for the hazardous condition into a plurality of grid cells; and calculate a probability density for each grid cell based on the augmented covariance of the Gaussian clusters and respective mixing probabilities, where the probability density is indicative of a probability of the hazardous condition existing at the respective grid cell.

Embodiments may include program code instructions to: select a first subset of grid cells to define a polygon bounded by the boundary; and select a second subset of grid cells to define the confidence band within the boundary. The program code instructions to provide for an indication of the boundary and the confidence band to at least one of an autonomous vehicle control of an autonomous vehicle or to a driver of a vehicle may include program code instructions to: provide for a change in operational state of a vehicle in response to the vehicle approaching or entering a region corresponding to at least one of the boundary or the confidence band. The program code instructions to provide for a change in an operational state of a vehicle in response to the vehicle approaching or entering a region corresponding to at least one of the boundary or the confidence band may include program code instructions to: provide an indication that autonomous vehicle control of the vehicle is ceding vehicle control to a driver. The program code instructions to provide for a change in an operational state of a vehicle in response to the vehicle approaching or entering a region corresponding to at least one of the boundary or the confidence band may include program code instructions to provide for at least one of: a change to a traction control setting of the vehicle, a change to a drive mode of the vehicle, or a change to a transmission shift pattern of the vehicle.

Embodiments provided herein may include a method including the operations of: receiving a plurality of probe data points from a plurality of probes within a region, where each probe data point includes location information and an indication of a hazardous condition; generating, based on the plurality of probe data points indicating a hazardous condition, a boundary within the region identifying an area within which the hazardous condition is determined to exist with at least a first degree of confidence; generating, based on the plurality of probe data points indicating a hazardous condition, a confidence band within the boundary within which the hazardous condition is determined to exist with a second degree of confidence, higher than the first degree of confidence; and providing for an indication of the boundary and the confidence band to at least one of an autonomous vehicle control of an autonomous vehicle or to a driver assistance system.

According to some embodiments, generating a boundary within the region within which the hazardous condition is determined to exist with at least a first degree of confidence based on the plurality of probe data points is further based on time information associated with the probe data points. Generating a boundary within the region identifying an area within the region within which the hazardous condition is determined to exist with at least a first degree of confidence based on the plurality of probe data may include: modelling the probe data using a Gaussian Mixture Model to identify Gaussian clusters and respective mixing probabilities; generating a covariance matrix based on the Gaussian Mixture Model; augmenting the covariance matrix of each Gaussian cluster; dividing a bounding box for the hazardous condition into a plurality of grid cells; and calculating a probability density for each grid cell based on the augmented covariance of the Gaussian clusters and respective mixing probabilities, where the probability density is indicative of a probability of the hazardous condition existing at the respective grid cell.

Methods may include selecting a first subset of grid cells to define a polygon bounded by the boundary; and selecting a second subset of grid cells to define the confidence band within the boundary. Providing for an indication of the boundary and the confidence band to at least one of an autonomous vehicle control of an autonomous vehicle or to a driver of a vehicle may include: providing for a change in an operational state of a vehicle in response to the vehicle approaching or entering a region corresponding to at least one of the boundary or the confidence band. Providing for a change in an operational state of a vehicle in response to the vehicle approaching or entering a region corresponding to at least one of the boundary or the confidence band may include providing an indication that autonomous vehicle control of the vehicle is ceding control to a driver.

Embodiments provided herein may include an apparatus including: means for receiving a plurality of probe data points from a plurality of probes within a region, where each probe data point includes location information and an indication of a hazardous condition; means for generating, based on the plurality of probe data points indicating a hazardous condition, a boundary within the region identifying an area within which the hazardous condition is determined to exist with at least a first degree of confidence; means for generating, based on the plurality of probe data points indicating a hazardous condition, a confidence band within the boundary within which the hazardous condition is determined to exist with a second degree of confidence, higher than the first degree of confidence; and means for providing for an indication of the boundary and the confidence band to at least one of an autonomous vehicle control of an autonomous vehicle or to a driver assistance system.

According to some embodiments, the means for generating a boundary within the region within which the hazardous condition is determined to exist with at least a first degree of confidence based on the plurality of probe data points is further based on time information associated with the probe data points. The means for generating a boundary within the region identifying an area within the region within which the hazardous condition is determined to exist with at least a first degree of confidence based on the plurality of probe data may include: means for modelling the probe data using a Gaussian Mixture Model to identify Gaussian clusters and respective mixing probabilities; means for generating a covariance matrix based on the Gaussian Mixture Model; means for augmenting the covariance matrix of each Gaussian cluster; means for dividing a bounding box for the hazardous condition into a plurality of grid cells; and means for calculating a probability density for each grid cell based on the augmented covariance of the Gaussian clusters and respective mixing probabilities, where the probability density is indicative of a probability of the hazardous condition existing at the respective grid cell.

The apparatus of some embodiments may include means for selecting a first subset of grid cells to define a polygon bounded by the boundary; and means for selecting a second subset of grid cells to define the confidence band within the boundary. The means for providing for an indication of the boundary and the confidence band to at least one of an autonomous vehicle control of an autonomous vehicle or to a driver of a vehicle may include: means for providing for a change in an operational state of a vehicle in response to the vehicle approaching or entering a region corresponding to at least one of the boundary or the confidence band. The means for providing for a change in an operational state of a vehicle in response to the vehicle approaching or entering a region corresponding to at least one of the boundary or the confidence band may include means for providing an indication that autonomous vehicle control of the vehicle is ceding control to a driver.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
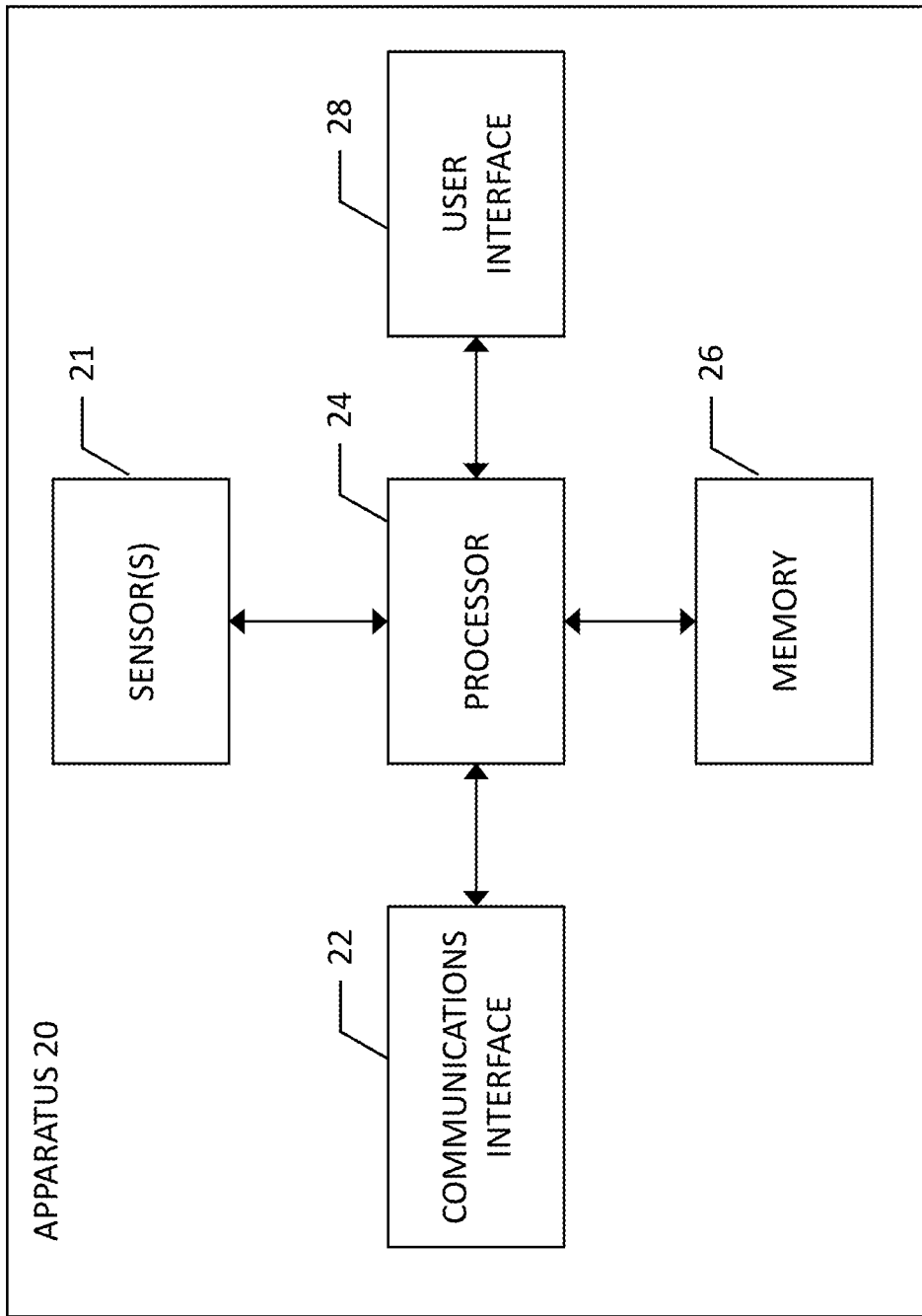
Figure 2:
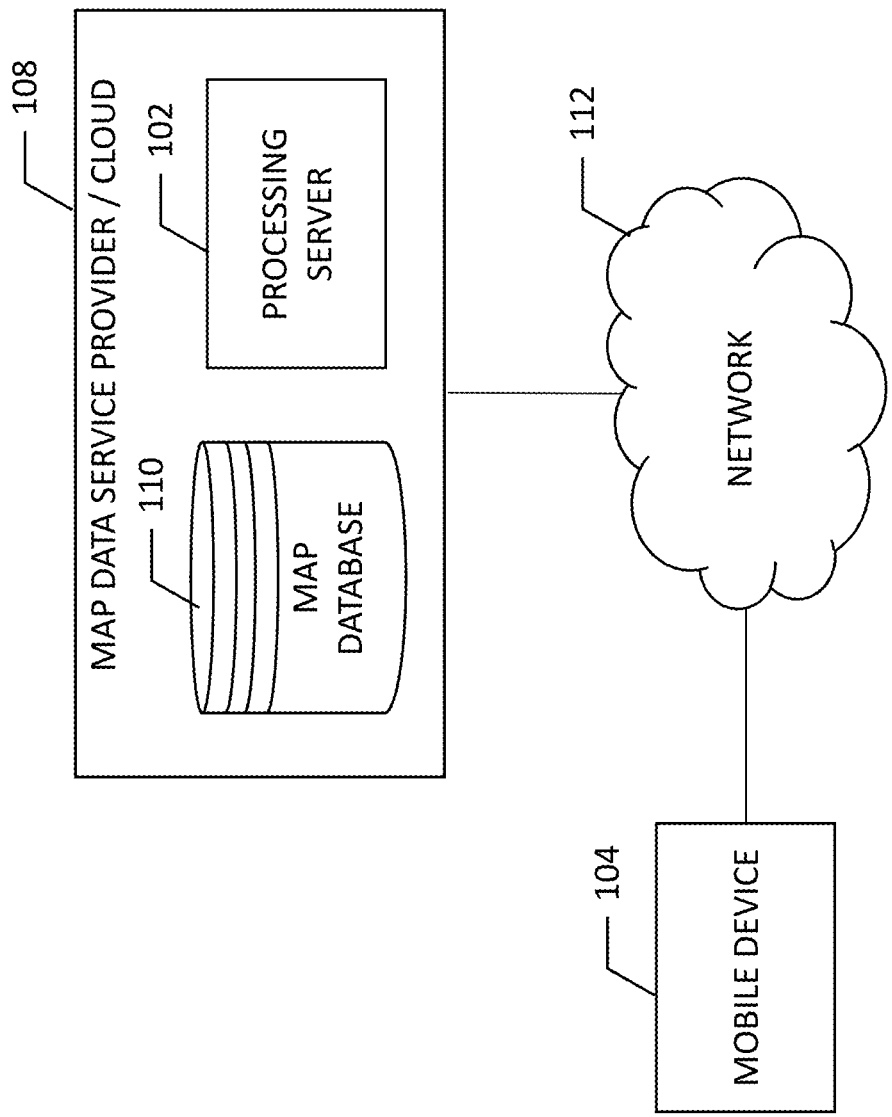
Figure 3:
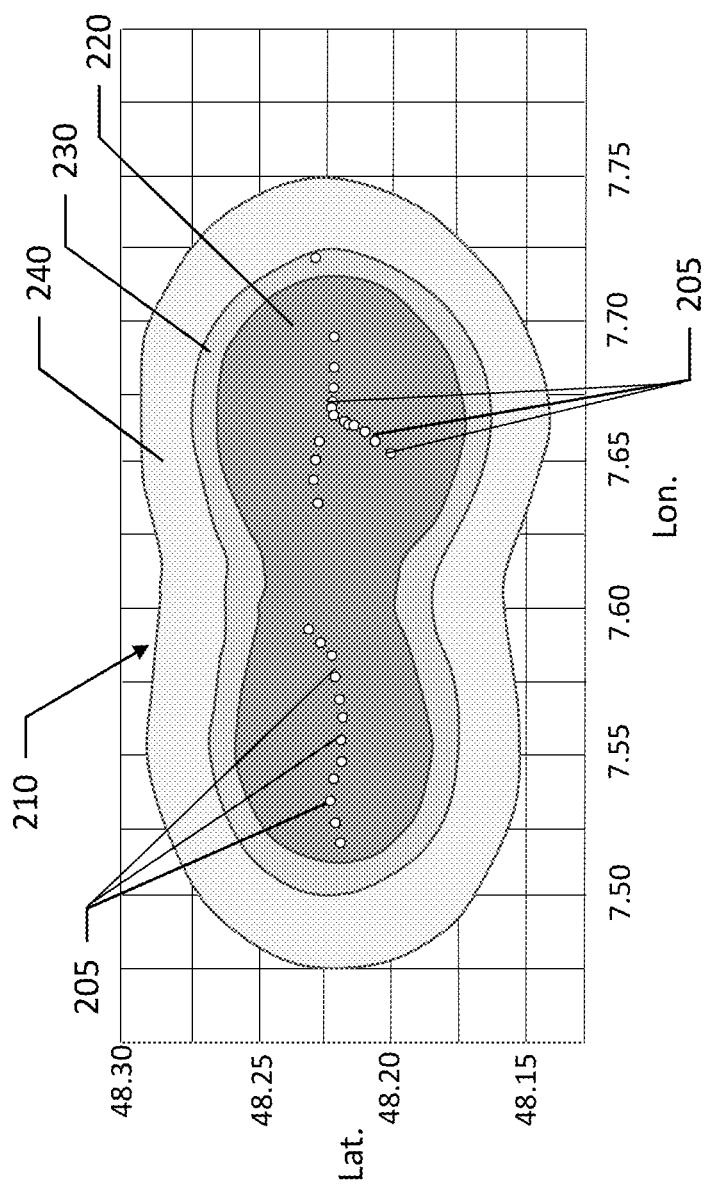
Figure 4:
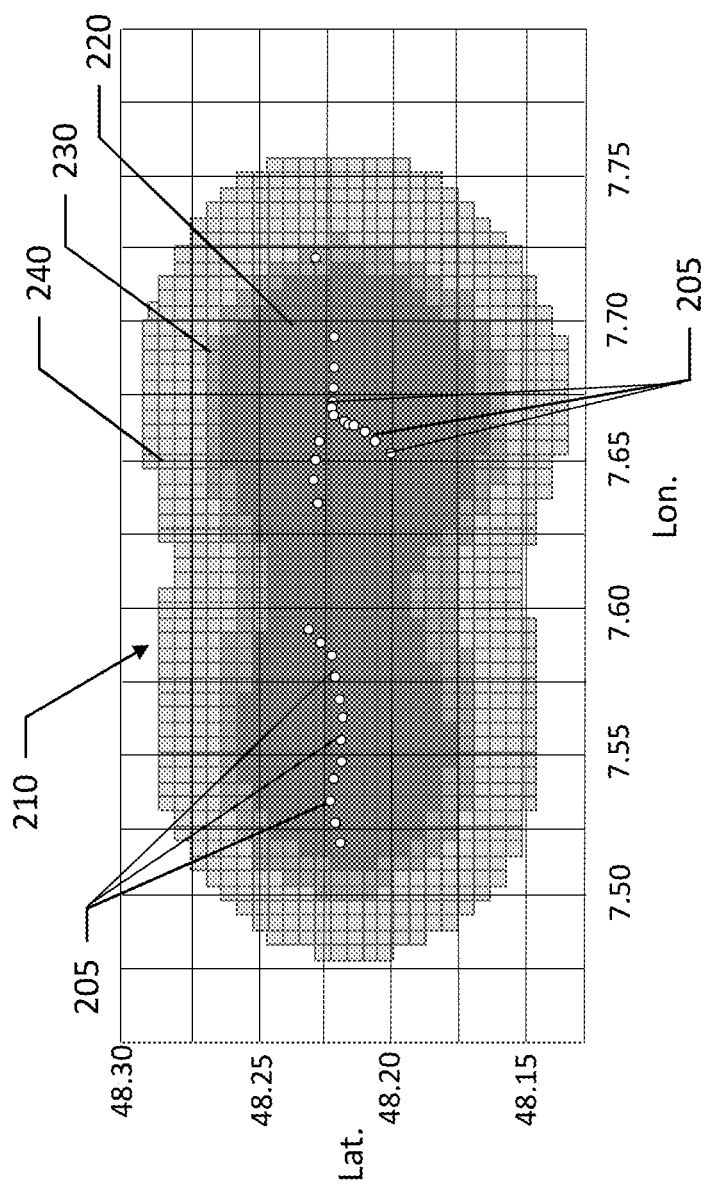

Having thus described certain example embodiments of the present disclosure in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for generating hazard probability boundary according to an example embodiment of the present disclosure;

FIG. 3 illustrates an example embodiment of a boundary defining an area having a hazardous condition according to an example embodiment of the present disclosure;

FIG. 4 illustrates another example embodiment of a boundary defining an area having a hazardous condition with a larger grid size according to an example embodiment of the present disclosure; and FIG. 5 is a flowchart of a method for generating a local hazard warning boundary with one or more confidence bands according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for identifying an area bounded by a polygonal boundary that contains hazardous conditions, and identifying different bands of confidence of the hazardous condition within the polygonal boundary. In this regard, a user interface of a device, such a mobile device or a device affixed to a vehicle, such as to a dashboard or the like, may provide hazard warnings to a user, which may aid the user in navigation or driving in an instance in which the user is traveling by vehicle. The display of a device such as a navigation system may provide information to a driver about hazards at or near their current location or hazards that are upcoming along their route or potential route. Further, such hazard warnings may be used by autonomous vehicle controls to provide some degree of control responsive to the hazardous condition identified provided the quality score satisfies a predetermined value.

As described herein, example embodiments of the claims may provide for the generation of hazard probability polygonal boundaries with different bands of confidence of the presence of the hazard. The hazard probability polygonal boundaries may be provided to a user via any available device, such as a mobile phone, tablet computer, fixed computer (e.g., desktop computer), or the like. Optionally, the hazard probability boundaries with different bands of confidence may be provided to autonomous or semi-autonomous vehicle controls to aid the autonomous controls in providing safe travel along a road network. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. A navigation system may be used in the absence of a discrete destination to provide driver assistance and information.

Example embodiments described herein may provide a user device or navigation system where a portion of a user interface is used to present a local hazard warning to a user. A warning may include an alert to a user that adverse weather conditions are present proximate the user. The warning may be generated based on crowd-sourced weather-related information from vehicles, where the vehicles may be configured to report instances of adverse weather, including precipitation or foggy conditions. Precipitation may be in the form of rain, snow, sleet, hail, or ice, and the warning may communicate the severity of the condition in certain circumstances. The warning may be provided to a user of a device via a user interface, which may indicate that the warning corresponds to a current location of the user, or an anticipated future location of the user. According to example embodiments described herein, a probability or confidence of the local hazard condition relative to a location may also be provided to allow a user to determine any precautionary measures that may be necessary to avoid or prepare for the local hazard conditions.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like.

Autonomous and semi-autonomous vehicles may use HD maps and an understanding of the context (e.g., traffic, weather, road construction, etc.) to help navigate and to control a vehicle along its path. In an instance in which a vehicle is subject to complete or partial autonomous control, hazard warnings may inform the vehicle enabling appropriate actions to be taken. Those actions may include re-routing to avoid or partially avoid hazardous conditions, or to alter the operational state of the vehicle according to the hazard. Such operational state adjustments may include transitioning from two-wheel-drive to all-wheel-drive, changing the operational state of a traction control system from a dry-condition setting to a wet or snowy/icy condition setting, altering the transmission shift strategy or pattern to use lower gearing, or the like.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering weather related information and/or for presenting local hazard warnings to a user via a user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as certain weather conditions and establish location based on other sensor data, such as GPS data, for providing weather condition information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based hazard warnings associated with the current location of the device and user. While a service provider may be specifically configured to provide local hazard warnings to a user, such a service may be enhanced or improved through cooperation with a map-based service provider. A user in their home may be able to watch television, visit a website on the internet, or listen to a radio station to understand weather patterns and potential hazard warnings at their relatively stationary location. However, when traveling, a user's location may be readily changing and their ability to continually monitor weather conditions or potential hazards may be limited. As such, a navigation system may be an ideal counterpart to a location-based hazard warning system as described herein. It is, however, appreciated that example embodiments described herein can be implemented outside of a navigation system, such as on a user device or other device that may not necessarily also provide navigation services.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, an advanced driver assistance system (ADAS), or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

Information regarding a geographic region may be stored in the map database, such as a segmentation of a geographic region into a plurality of "tiles" by overlaying a virtual grid over a region. Each square or rectangular tile within the grid (though it could be any polygon shape, regular or irregular) may include a reference point for the respective tile. In a regular-shaped polygon, that reference point may be a centroid of the tile. The tiles may have any size or area, but may be sized according to a uniform grid for an entire map or region, or may be sized based on a density of map elements, such as points of interest, within a region. Map tiles may include a "level" of granularity or detail, where map tiles may be sized based on various attributes of the mapped region. Further, with respect to hazards that include weather affecting particular regions, the tiles may be sized according to a granularity with which weather can be estimated on a local level. For example, a 500-meter by 500-meter square may be a tile size for which weather can be estimated, whether by local sensors within the tile, or based on regional weather radar information. As technology improves, the ability to estimate weather may be performed on a more granular level, such as in tiles with a size of 100-meters by 100-meters, for example.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Example embodiments provided herein provide a method of presenting useful information to a driver through a user device and/or navigation system to alert a user to a local hazard, such as a weather event. Methods described herein establish a boundary within which hazardous conditions exist, and provide bands of confidence of the hazardous condition within the boundary. Users located within the hazardous condition boundary (and within a particular confidence band) or users that may soon enter the boundary or move between confidence bands of the boundary may be alerted or warned of the potential hazard.

Embodiments described herein facilitate the generation of hazardous condition boundaries defining a region within which hazardous conditions exist, and define confidence bands within the hazardous condition boundary to reflect the confidence with which the hazardous condition is likely to be encountered. While embodiments may provide information to a user regarding a local hazard, embodiments may optionally provide information to a controller of a vehicle that facilitates autonomous or semi-autonomous vehicle control, as noted above. In this manner, a warning may be provided to a vehicle and only to a user if configured as such, while the vehicle may take the necessary precautions based on the hazard warning and the associated quality of the local hazard warning information. While hazard warnings may be communicated only to a user/driver of a vehicle, or only to an autonomous vehicle, embodiments may provide the hazard warning to both the vehicle and the user to facilitate various degrees of autonomous vehicle control while also providing information to the driver to take the necessary precautions.

According to example embodiments described herein, the confidence with which a hazardous condition exists may be identified for a region. The confidence may be calculated based on sensor data and may incorporate weather data from generated by weather stations within a region. Users and vehicles receiving the hazard condition data can understand the confidence level of the hazardous condition in order to determine how to use the hazardous condition data. For example, if the computed confidence of a hazardous condition is high with respect to a location where a user is or where they may be headed, the user and/or the vehicle may trust that a hazard exists within the reported boundary, and take the appropriate precautions. If the computed confidence is low, then the user and/or vehicle can determine if any action is to be taken with respect to the identified hazardous condition.

According to an example embodiment, potentially hazardous conditions can be detected by a device, such as a mobile device 104 traveling along a roadway. Example conditions may include fog or precipitation which may be detected by vehicles having capabilities as described above with respect to apparatus 20. Precipitation may be determined based on windshield wiper function, for example, while fog conditions may be identified based on activation of fog lights of a vehicle. Precipitation or fog may optionally be determined based on sensors of a vehicle, which may be detected in the form of noise from a LiDAR sensor or the like. However, detecting weather conditions from a single vehicle, or even a plurality of vehicles, may not always be reliable. For example, if a number of vehicles happen to have their fog lights on during a clear day or evening, fog could be assumed while there may not be fog present. Similarly, if one or more vehicles are traveling behind a vehicle, such as a truck, that has accumulated snow or water, the vehicles traveling behind the truck may each turn on their windshield wipers, while a weather condition does not actually exist. In view of these deficiencies, embodiments described herein may use additional information in establishing the quality of hazard condition reporting.

Embodiments described herein use vehicle data reporting hazardous conditions along with independent weather information from weather stations and/or radar to establish the quality of the reported hazardous conditions. The weather conditions from the third party may be used to evaluate local hazard warnings (LHW) reported by vehicles to establish the quality thereof. Areas of a region for which a local hazard condition exists are extracted from vehicle data and compared against data from available weather data to measure quality.

While weather stations may provide weather information relating to a location proximate the weather station, weather outside of a predefined distance of the weather station may be less reliable. Sensor-equipped vehicles or mobile devices may provide reports for hazardous conditions as described above. These reported events may include the hazardous condition (e.g., adverse weather conditions such as precipitation or low-visibility) and provide a position of the vehicle or mobile device. Embodiments described herein may use the reported hazardous conditions to create a hazard probability boundary that will be provided to vehicles or mobile devices proximate the boundary or with a planned route that passes through the boundary. Hazardous condition reports do not require a map-matched location as the hazardous condition is not wed to map features such as road segments. Based on the hazardous condition information received, the system of example embodiments may not only provide a hazardous condition boundary, but can define confidence bands within the hazardous condition boundary that identify the confidence with which the hazardous condition exists in the different bands of the boundary.

According to an example embodiment, hazardous condition indications are received including an indication of the condition and a location of the condition. The system, such as map data service provider 108, may anonymize the hazardous condition indications. Optionally, the hazardous condition indications may be received from a third party, such as a vehicle manufacturer that receives hazardous condition information from vehicles of that manufacturer. Third parties may optionally include service providers (e.g., wireless carriers), application developers, or other entities. Third parties that receive hazardous condition indications may anonymize the hazardous condition indications before providing to a service such as map data service provider 108. The service provider may aggregate the hazardous condition indications and compute a probability boundary for the identified hazardous condition. Optionally, different hazardous conditions may be considered independently, such as a fog condition in a hazardous condition indication may be considered separately from a rain condition in a hazardous condition indication. This may result in hazardous condition boundaries that are condition dependent. Optionally, hazardous condition boundaries may represent multiple hazardous conditions, or hazardous condition boundaries may overlap to some degree, particularly where precipitation changes occur, such as between rain and hail, for example.

The computation of a hazardous condition boundary, whether for a single hazardous condition or for multiple conditions may be performed as described herein. Hazardous condition indications may be gathered for hazardous condition events within some time interval for a given region. When a hazardous condition indication is received, it may be compared against pre-existing hazardous conditions identified as present within the region of the new hazardous condition indication. If there is a pre-existing hazardous condition corresponding to the new indication, the new indication observation is added to the pre-existing hazardous condition, which may alter the confidence bands as described further below. If there are no other recent observations that correspond to the hazardous condition indication, then a new set may be created with a single observation from the hazardous condition indication.

The hazardous conditions within a region may be modeled based on observations generated from clusters of bivariate Gaussian distribution. Because intensity of hazardous conditions (e.g., rain or fog) may vary depending upon the location within an area of the hazardous condition, all Gaussian components may have a mixing parameter. A Gaussian Mixture Model (GMM) is a mixture of K Gaussian components. The GMM takes input points in space and computes parameters N ($\mu$, E) of each of the $i^{th}$ Gaussian Cluster N($\mu_i$, $\Sigma_i$) and mixing probability $\mu_i$.

The hazardous condition observations for a region are gathered within a predefined time interval (e.g., within the past 15 minutes), and the covariance matrix of each Gaussian cluster is augmented as shown:

$$\Sigma_i' = \begin{pmatrix} \lambda & 1 \\ 1 & \lambda \end{pmatrix} \circ \Sigma_i + (1-\lambda)\begin{pmatrix} s & 0 \\ 0 & s \end{pmatrix}$$

Where operator o is elementwise matrix product, value A allows a weight between observed $\Sigma_i$ and prior covariance, where A is a value from interval between [0, 1] inclusive of 0, 1. A typical value for A may be approximately 0.9. Parameter s controls prior for a covariance matrix. A typical value for s may be 0.25.

Bands for a hazardous condition boundary may be generated from a sufficiently large bounding box around the hazardous condition location. Initially, a bounding box may be defined around the hazardous condition location. The bounding box should be sufficiently large to cover the probabilistic boundary that is formed from the process. To cover 95.45% of the hazardous condition region:

obs_width=pos_leftmost_obs–pos_rightmost_obs obs_height=pos_topmost_obs–pos_bottommost_obs bounding_box_left=pos_leftmost_obs–2*obs_width bounding_box_right=pos_rightmost_obs+2*obs_width bounding_box_up=pos_topmost_obs+2*obs_height bounding_box_down=pos_bottommost_obs–2*obs_height Where the observation width is equal to the position of the leftmost observation minus the position of the rightmost observation. The observation height is equal to the position of the topmost observation minus the position of the bottommost observation. From the height and width, the bounding box can be generated by placing the left boundary of the bounding box at a position defined by subtracting two times the observation width from the position of the leftmost observation, and the right boundary of the bounding box is positioned by adding two times the observation width from the rightmost observation. Similarly, the position of the top boundary of the bounding box is defined by adding two times the observation height to the position of the topmost observation, and the bottom boundary of the bounding box is identified by subtracting two times the observation height from the position of the bottommost observation.

The bounding box defined above limits the computation so that the computation can be focused on a core portion of the data. The bounding box is made sufficiently large such that observations of a high confidence are not excluded. The use of twice the observed height and width in defining the bounding box may be a tunable parameter, such that the bounding box may be formed replacing the two in the above equations with any number. Further, the number may differ between the bounding box height and width positions. The bounding box defined above is then divided into a grid of tiles. This divides the bounding box into smaller tiles where a size may be selected to reflect a granularity of the data available. The smaller tile size may be of a predetermined size, and may optionally be non-square tiles and non-quadrilateral tiles.

For each tile, a probability density may be calculated at the centroid _ of the tile. For a center of each tile in the grid, consider:

$$g(x|\mu_i\Sigma_i') = N(\mu_i\Sigma_i')$$

Here $g(x|\mu_i\Sigma_i')$ is the probability density of a point $g(x|\mu_i\Sigma_i')$ generated from bivariate normal distribution with mean $\mu_i$ and covariance matrix $\Sigma_i'$ which are $i^{th}$ Gaussians from above. Then the following may be computed:

$$p(x) = \sum_{i=1}^{k} \pi_i g(x|\mu_i\Sigma_i')$$

Here $p(x)$ will compute probability density of x being generated from the whole Gaussian mixture model. Where $\pi_i$ is a mixing probability for $i^{th}$ Gaussian computed above, The product of $\pi_i$ and $g(x|\mu_i\Sigma_i')$ is summed over each of K Gaussians which were previously computed as described above.

The probability density P(x) is computed for each tile centered at x.

$$P(x) = p(x) * tile\_width * tile\_height$$

Here, P(x) is the probability of the tile centered at x.

Based on the probability of each tile P(x), all tiles within the bounding box may be sorted in descending order which prioritizes tiles that have the greatest probability of having hazardous conditions. A cumulative, running sum for all probabilities P(x) may be kept. The cumulative sum sequence may be used to mark sorted tiles from the top (highest probability) according to a corresponding confidence/probability interval. The intervals or "confidence bands" of the tiles may be configurable, but are herein identified as 68.27%, 80.00%, and 95.45%. The highest confidence area contains 68.27% of the hazardous condition, the next-most outer band includes 80.00% of the hazardous condition, and the outermost band includes 95.45% of the hazardous condition.

FIG. 3 illustrates an example embodiment of a boundary 210 defining an area having a hazardous condition, wherein the boundary 210 includes bands 220, 230, and 240 representing different confidence intervals of the presence of the hazard condition. According to the illustrated embodiment, the points 205 illustrate hazard condition observation locations reported by vehicles or mobile devices within the region. Each of the points 205 represent a hazard condition observation reported within a predefined time window, such as within the last fifteen minutes. This time period may be a rolling time window whereby observations that are older than a predefined amount of time are discarded.

The inner-most band 220 of the boundary 210 reflects 68.27% of the hazardous condition, while band 230 reflects 80.00% of the hazardous condition, and band 240 encompasses 95.45% of the hazardous condition. This example embodiment may be computed by the method detailed above using a grid tile height and width of approximately 0.0013 degrees of latitude and longitude.

A vehicle planning a route passing through the hazardous region may be able to require manual operation/driving when entering the boundary 210 or within a specific band of the boundary if the risk of the hazard condition on the route is sufficiently high. Optionally, a user may be alerted to the hazardous condition region and take any action needed based on this alert. If multiple routes through the region are available, a route may be chosen (e.g., by the user, by a navigation service, or by vehicle autonomy) to avoid the hazardous condition region or travel through a band of the region with a lower confidence of the hazardous condition.

The boundary of FIG. 3 is relatively smooth due to the use of very small grid tiles with height and width of about 0.0013 degrees of latitude. However, using grid tiles that are smaller results in a greater amount of computation and more processing capacity. The advantage of smaller tiles is the very high granularity that can be achieved. However, with the added complexity of computation and processing, the high granularity is achieved at a cost. Embodiments may use larger grid tiles which may save both time and processing resources. FIG. 4 illustrates a grid height and width that is approximately 0.005 degrees of longitude in width and 0.005 degrees of latitude in height. As shown, the boundaries are more pixelated and less granular than using a smaller grid tile. The advantages of the larger grid tile are that many fewer computations have to be done as the probabilities are calculated on a per-tile basis.

The quality measure of example embodiments described herein may be used to determine a response to the detected local hazard warnings. For example, a vehicle traveling within a road network to a destination may have a route extending through a boundary corresponding to a local hazard warning. In response to receiving a quality measure of the local hazard warning boundary, actions may optionally be taken. If the route passes through a higher confidence band of a boundary (e.g., 220 of FIG. 3) representing a hazardous condition, an action of a user or of an autonomous vehicle may be to take extra precautions while traversing the local hazard warning boundary. For instance, a speed of travel may be reduced, a traction control system may become more sensitive, a vehicle state may transition from two-wheel-drive to all-wheel-drive, etc. In an instance in which a local hazard condition boundary is established and the area within the local hazard condition boundary has heavy traffic or is historically unsafe in hazardous conditions, a vehicle may be instructed to avoid the area covered by the boundary or at least certain confidence bands of the boundary. Such instructions may be provided to a user via a navigation system, or interpreted by an autonomous vehicle to alter a route, for example. Optionally, in response to establishing that a route of an autonomous vehicle traverses a boundary corresponding to a local hazard condition or specific confidence bands thereof, autonomous vehicle control may be limited or ended with manual control returned to the driver who may be better equipped to handle the adverse conditions.

Embodiments described herein provide a confidence measure that may influence how a local hazard warning is processed by a navigational system or autonomous vehicle control system. In this manner, a user may be presented with an alert to a local hazard warning area and a boundary having differing confidence interval bands identifying the confidence with which the hazardous condition exists within a certain area. The user may be presented with an option to take action with respect to the local hazard, or not. This decision may be influenced by the confidence interval of the data, and a user may optionally take into consideration current context of the vehicle, such as if it is apparent that a hazard condition is likely (e.g., if storm clouds are visible). Similarly, an autonomous vehicle may use the quality of information with respect to a local hazard warning area to determine what actions may be taken responsive to the information. A threshold may be set, either manually by a user or by the autonomous vehicle control system, below which no action is taken in response to a route traversing a low-confidence band of a hazardous condition, or above which action may be taken in response to a route entering a boundary having a high confidence of the hazardous condition. Further, there may be multiple thresholds, where different actions are taken based on the quality of the local hazard warning area information. For example, a hazard condition of a moderate level of confidence (e.g., band 230 of boundary 210 of FIG. 3) may result in some actions taken, while different, more substantial actions may be taken by an autonomous vehicle controller or a user in response to a route entering the higher confidence boundary 220.

FIG. 5, described below, is a flowchart illustrative of methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 illustrates a method for generating a boundary for identifying an area bounded by a boundary that contains hazardous conditions, and identifying different bands of confidence of the hazardous condition within the boundary. As shown at 310, a plurality of probe data points are received including location information and an indication of a hazardous condition. The hazardous condition may be a weather condition, a traffic anomaly, or any irregular condition relating to travel along a road network. Based on the probe data points indicating the hazardous condition, a boundary within the region is generated at 320 identifying the area within which the hazardous condition is determined to exist with a first degree of confidence. At 330, a confidence band is generated based on the probe data within which the hazardous condition is determined to exist with a second degree of confidence. An indication is provided at 340 of the boundary and the confidence band to at least one of an autonomous vehicle control of an autonomous vehicle or a driver assistance system.

In an example embodiment, an apparatus for performing the method of FIG. 5 above may comprise a processor (e.g., the processor 24) configured to perform some or each of the operations (310-340) described above. The processor may, for example, be configured to perform the operations (310-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-340 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive a plurality of probe data points from a plurality of probes within a region, wherein each probe data point comprises location information and an indication of a hazardous condition;
   generate, based on the plurality of probe data points indicating a hazardous condition, a boundary within the region identifying an area within which the hazardous condition is determined to exist with at least a first degree of confidence;
   generate, based on the plurality of probe data points indicating a hazardous condition, a confidence band within the boundary within which the hazardous condition is determined to exist with a second degree of confidence, higher than the first degree of confidence; and
   provide for an indication of the boundary and the confidence band to at least one of an autonomous vehicle control of an autonomous vehicle or to a driver assistance system.

2. The apparatus of claim 1, wherein causing the apparatus to generate the boundary within the region identifying the area within which the hazardous condition is determined to exist with at least the first degree of confidence based on the plurality of probe data points is further based on: time information associated with the probe data points.

3. The apparatus of claim 1, wherein causing the apparatus to generate the boundary within the region within which the hazardous condition is determined to exist with at least the first degree of confidence based on the plurality of probe data points comprises causing the apparatus to:
  model the probe data using a Gaussian Mixture Model to identify Gaussian clusters and respective mixing probabilities;
  generate a covariance matrix based on the Gaussian Mixture Model;
  augment the covariance matrix of each Gaussian cluster;
  divide a bounding box for the hazardous condition into a plurality of grid cells; and
  calculate a probability density for each grid cell based on the augmented covariance of the Gaussian clusters and respective mixing probabilities, wherein the probability density is indicative of a probability of the hazardous condition existing at the respective grid cell.

4. The apparatus of claim 3, wherein the apparatus is further caused to:
  select a first subset of grid cells to define a polygon bounded by the boundary; and
  select a second subset of grid cells to define the confidence band within the boundary.

5. The apparatus of claim 1, wherein causing the apparatus to provide for the indication of the boundary and the confidence band to at least one of the autonomous vehicle control of the autonomous vehicle or to the driver of the vehicle comprises causing the apparatus to:
  provide for a change in an operational state of a vehicle in response to the vehicle approaching or entering a region corresponding to at least one of the boundary or the confidence band.

6. The apparatus of claim 5, wherein causing the apparatus to provide for the change in the operational state of the vehicle in response to the vehicle approaching or entering the region corresponding to at least one of the boundary or the confidence band comprises causing the apparatus to:
  provide an indication that autonomous vehicle control of the vehicle is ceding vehicle control to a driver.

7. The apparatus of claim 5, wherein causing the apparatus to provide for the change in the operational state of the vehicle in response to the vehicle approaching or entering the region corresponding to at least one of the boundary or the confidence band comprises causing the apparatus to provide for at least one of: changing a traction control setting of the vehicle, changing a drive mode of the vehicle, or changing a transmission shift pattern of the vehicle.

8. A computer program product comprising at least one non-transitory computer-readable storage medium having computer-executable program code instructions stored therein, the computer-executable program code instructions comprising program code instructions to:
  receive a plurality of probe data points from a plurality of probes within a region, wherein each probe data point comprises location information and an indication of a hazardous condition;
  generate, based on the plurality of probe data points indicating a hazardous condition, a boundary within the region identifying an area within which the hazardous condition is determined to exist with at least a first degree of confidence;
  generate, based on the plurality of probe data points indicating a hazardous condition, a confidence band within the boundary within which the hazardous condition is determined to exist with a second degree of confidence, higher than the first degree of confidence; and
  provide for an indication of the boundary and the confidence band to at least one of an autonomous vehicle control of an autonomous vehicle or to a driver assistance system.

9. The computer program product of claim 8, wherein the program code instructions to generate the boundary within the region identifying the area within which the hazardous condition is determined to exist with at least the first degree of confidence based on the plurality of probe data points is further based on: time information associated with the probe data points.

10. The computer program product of claim 8, wherein the program code instructions to generate the boundary within the region identifying the area within the region within which the hazardous condition is determined to exist with at least the first degree of confidence based on the plurality of probe data points comprise program code instructions to:
  model the probe data using a Gaussian Mixture Model to identify Gaussian clusters and respective mixing probabilities;
  generate a covariance matrix based on the Gaussian Mixture Model;
  augment the covariance matrix of each Gaussian cluster;
  divide a bounding box for the hazardous condition into a plurality of grid cells; and
  calculate a probability density for each grid cell based on the augmented covariance of the Gaussian clusters and respective mixing probabilities, wherein the probability density is indicative of a probability of the hazardous condition existing at the respective grid cell.

11. The computer program product of claim 10, further comprising program code instructions to:
  select a first subset of grid cells to define a polygon bounded by the boundary; and
  select a second subset of grid cells to define the confidence band within the boundary.

12. The computer program product of claim 8, wherein the program code instructions to provide for the indication of the boundary and the confidence band to at least one of the autonomous vehicle control of the autonomous vehicle or to the driver of the vehicle comprise program code instructions to:
  provide for a change in an operational state of a vehicle in response to the vehicle approaching or entering a region corresponding to at least one of the boundary or the confidence band.

13. The computer program product of claim 12, wherein the program code instructions to provide for the change in the operational state of the vehicle in response to the vehicle approaching or entering the region corresponding to at least one of the boundary or the confidence band comprise program code instructions to:
  provide an indication that autonomous vehicle control of the vehicle is ceding vehicle control to a driver.

14. The computer program product of claim 12, wherein the program code instructions to provide for the change in the operational state of the vehicle in response to the vehicle approaching or entering the region corresponding to at least one of the boundary or the confidence band comprise program code instructions to: provide for at least one of: a change to a traction control setting of the vehicle, a change to a drive mode of the vehicle, or a change to a transmission shift pattern of the vehicle.

15. A method comprising:
   receiving a plurality of probe data points from a plurality of probes within a region, wherein each probe data point comprises location information and an indication of a hazardous condition;
   generating, based on the plurality of probe data points indicating a hazardous condition, a boundary within the region identifying an area within which the hazardous condition is determined to exist with at least a first degree of confidence;
   generating, based on the plurality of probe data points indicating a hazardous condition, a confidence band within the boundary within which the hazardous condition is determined to exist with a second degree of confidence, higher than the first degree of confidence; and
   providing for an indication of the boundary and the confidence band to at least one of an autonomous vehicle control of an autonomous vehicle or to a driver assistance system.

16. The method of claim 15, wherein generating the boundary within the region within which the hazardous condition is determined to exist with at least the first degree of confidence based on the plurality of probe data points is further based on: time information associated with the probe data points.

17. The method of claim 15, wherein generating the boundary within the region identifying the area within the region within which the hazardous condition is determined to exist with at least the first degree of confidence based on the plurality of probe data points comprises:
   modelling the probe data using a Gaussian Mixture Model to identify Gaussian clusters and respective mixing probabilities;
   generating a covariance matrix based on the Gaussian Mixture Model;
   augmenting the covariance matrix of each Gaussian cluster;
   dividing a bounding box for the hazardous condition into a plurality of grid cells; and
   calculating a probability density for each grid cell based on the augmented covariance of the Gaussian clusters and respective mixing probabilities, wherein the probability density is indicative of a probability of the hazardous condition existing at the respective grid cell.

18. The method of claim 17, further comprising:
   selecting a first subset of grid cells to define a polygon bounded by the boundary; and
   selecting a second subset of grid cells to define the confidence band within the boundary.

19. The method of claim 15, wherein providing for the indication of the boundary and the confidence band to at least one of the autonomous vehicle control of the autonomous vehicle or to the driver of the vehicle comprises:
   providing for a change in an operational state of a vehicle in response to the vehicle approaching or entering a region corresponding to at least one of the boundary or the confidence band.

20. The method of claim 19, wherein providing for the change in the operational state of the vehicle in response to the vehicle approaching or entering the region corresponding to at least one of the boundary or the confidence band comprises:
   providing an indication that autonomous vehicle control of the vehicle is ceding vehicle control to a driver.

* * * * *